Jan. 4, 1927.
J. M. REITER ET AL
1,612,884
ROLLER BEARING REMOVER
Filed Nov. 28, 1924
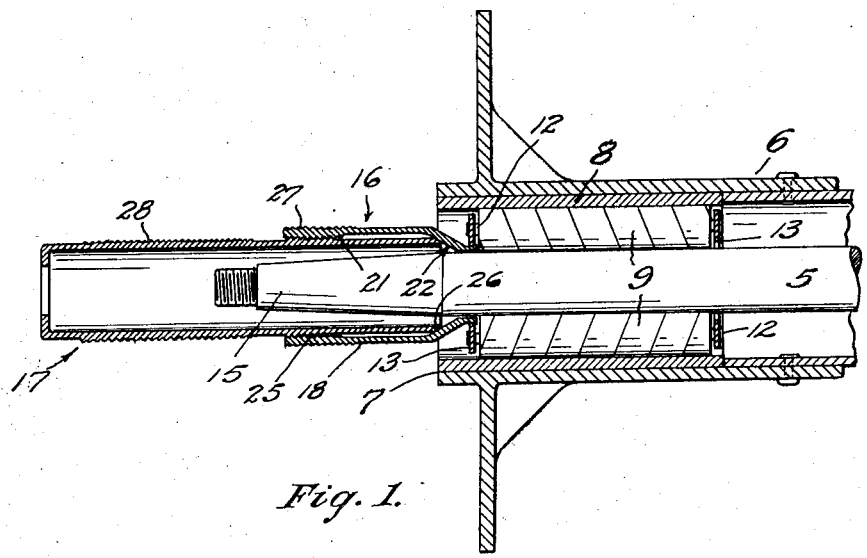
Fig. 1.
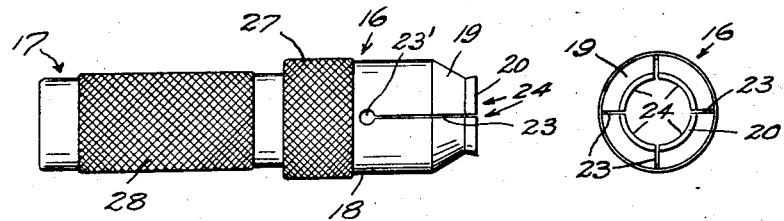
Fig. 2.
Fig. 3.
INVENTORS:
John M. Reiter
Casey Nenney
James F. Payne
BY
Pierre Barnes
ATTORNEY Patented Jan. 4, 1927.

1,612,884

UNITED STATES PATENT OFFICE.

JOHN M. REITER, CASEY NANNEY, AND JAMES F. PAYNE, OF AUBURN, WASHINGTON.

ROLLER-BEARING REMOVER.

Application filed November 28, 1924. Serial No. 752,813.

This invention relates to implements for removing roller bearings from the axle housings of motor vehicles, and has for its object the provision of an improved implement of this character to facilitate the removal of such roller bearings.

To this end the invention consists in the novel construction, adaptation and combination of parts hereinafter described and claimed.

In the accompanying drawing,—

Figure 1 is a view partly in longitudinal section and partly in side elevation of devices embodying our invention shown applied. Fig. 2 is a side elevation of the implement; and Fig. 3 is an end elevation of Fig. 2.

In said drawing, the reference numeral 5 represents an axle extending through a housing 6 which, at its outer end, is provided with a cylindrical cavity 7 to receive a sleeve 8 which serves as the outer bearing for a roller bearing assembly, which assembly is hereinafter designated as the roller bearing. Said roller bearing, as shown, consists of a plurality of rollers 9 arranged concentrically about the journal portion of said axle by the provision of studs such as 12 which are carried in spaced relations by means of annular retainers 13 at opposite ends of the rollers. These retainers are of greater internal diameter than the diameter of the axle journal and are connected with each other and to said rollers in a manner to permit a limited axial movement of the rollers with respect to the retainers.

The portion 15 of the axle which protrudes from the housing is formed of a conical shape to engage within a corresponding aperture of a vehicle wheel, not shown.

The above described parts are, or may be, of any known or suitable construction.

The implement which constitutes the subject of the present invention comprises a tubular expansion member 16 and a tubular operating member 17.

The expansion member 16 is formed exteriorly with a substantially cylindrical rear portion 18, a forwardly tapering intermediate portion 19 and a front portion 20. Said front portion 20 is desirably of a conoidal shape the forward extremity being of larger diameter and thence the portion 20 tapers rearwardly as best shown in Fig. 2 to afford with the periphery of the portion 19 a recess extending circumferentially around the member.

Adjacent its rear end said expansion member is formed interiorly to provide screw threads 21 and adjacent its forward end is provided with a tapering peripheral surface 22. Said expansion member is furthermore slotted longitudinally as at 23 from its forward end to apertures such as $23^1$ to afford fingers 24, each having a substantially hook-shaped forward extremity.

The operating member 17 is provided intermediate its length with screw threads 25 engaging the internal threads 21 of the expansion member to effect relative axial movement of the operating member when the latter is independently rotated within the expansion member. When the expansion member 16 is held against rotary motion and the operating member 17 suitably rotated to thrust its forward end 26 against the tapering peripheral surface 22 of the expansion member, the fingers of the expansion member are forced radially outward. When the operating member is retracted from its engagement with the surface 22, the resiliency of the expansion member fingers effect the relative contraction of the same, the flexure of the fingers occurring principally at the portions thereof of reduced width between the adjacent apertures $23^1$.

To permit the two members to be readily grasped in the hands of an operator, portions of the outer peripheral surfaces are desirably knurled as at 27 and 28, respectively.

In the practice of our invention, the implement is applied over the axle part 15 with the hooked ends of the fingers 24 inserted within the opening of the adjacent retainer 13. Thus arranged the operator holds in one of his hands the expansion member 16 from turning and with his other hand rotates the operating member 17 which is thereby thrust forward to cause the fingers to be relatively expanded to engage the retainer above referred to.

The device is thus coupled with the associated roller bearing assembly which is extracted from the axle housing by withdrawing the device from the axle.

While we have described the invention in its construction now preferred by us, it is to be understood that we do not wish to confine ourselves specifically thereto except as limited by the scope of the appended claims.

What we claim, is,—

1. In an implement for removing a roller-bearing assembly from a vehicle axle, a tubular member slotted at the front end to provide a plurality of fingers, said fingers being formed with relatively tapering inner surfaces and substantially hook-shaped outer surfaces, screw threads provided interiorly of said member adjacent its rear end, and a second tubular member adapted to receive the axle end therein and provided intermediate its length with external screw threads engaging the screw threads of the first named member, said second named member being adapted when moved in one axial direction to engage the tapering surfaces of said fingers to distend the latter radially of the axle into engaging relation with the roller bearing assembly.

2. In an implement for removing a roller-bearing assembly from a vehicle axle within the axle housing, a tubular member the front end of which is provided with quadrifid slots to provide a plurality of fingers, said slots terminating in apertures of greater diameter than the widths of the respective slots to provide a relatively weak area between the apertures at opposite sides of each finger, said fingers being formed with relatively tapering inner surfaces and substantially hooked-shaped outer surfaces, screw threads provided interiorly of said member adjacent its rear end, and a second tubular member adapted to surround the axle within the first named member provided intermediate its length with external screw threads engaging the screw threads of the first named member, said second named member being adapted when moved in one axial direction to engage the tapering surfaces of said fingers to distend the latter radially of the axle into engaging relation with the roller bearing assembly.

Signed at Seattle, Washington, this 12th day of November 1924.

JOHN M. REITER.
CASEY NANNEY.
JAMES F. PAYNE.